United States Patent [19]
Benjamin et al.

[11] 4,155,564
[45] May 22, 1979

[54] ROTATABLE CHUCK MECHANISM

[75] Inventors: Milton L. Benjamin, Moreland Hills; Wilbur N. Miles, Chagrin Falls, both of Ohio

[73] Assignee: Erickson Tool Company, Cleveland, Ohio

[21] Appl. No.: 839,766

[22] Filed: Oct. 6, 1977

[51] Int. Cl.² .................. B23B 31/14; B23B 31/16; B23B 31/26
[52] U.S. Cl. ................................................ 279/121
[58] Field of Search .................. 279/121, 70, 110, 1 C

[56] References Cited

U.S. PATENT DOCUMENTS

| | | | |
|---|---|---|---|
| 1,449,454 | 3/1923 | Smith | 279/1 C |
| 2,828,134 | 3/1958 | Buck et al. | 279/121 X |
| 2,982,558 | 5/1961 | Multer | 279/1 C |
| 3,460,849 | 8/1969 | Highberg | 279/121 |
| 3,663,029 | 5/1972 | Dexter | 279/110 X |
| 3,704,022 | 11/1972 | Blattry et al. | 279/110 X |
| 4,007,943 | 2/1977 | Scharfen et al. | 279/121 |
| 4,026,566 | 5/1977 | Röhm | 279/121 |
| 4,047,723 | 9/1977 | Buck | 279/121 |

*Primary Examiner*—Horace M. Culver
*Attorney, Agent, or Firm*—Pearne, Gordon, Sessions, McCoy and Granger

[57] ABSTRACT

A chuck is disclosed wherein the jaws of the chuck may be locked by tapered lock means so that if actuating force on the chucking and unchucking actuator is lost during rotation of the chuck, the external diameter of the workpiece will still be gripped by the jaws. A first linkage in the chuck body interconnects an axially movable actuator with the radially movable master jaws. This may be a bell crank lever or an interconnecting wedge. First lost motion means is provided in this first linkage. A second linkage is provided from the actuator to the tapered lock means and includes a second lost motion means which is smaller than the first lost motion means. A spring urges the tapered lock means into a locked position when the workpiece is chucked and then if force is lost on the actuator, this tapered lock means acting on the master jaws prevents release of the workpiece. When the actuator is moved toward the unchucking position, it acts first through the second lost motion connection to release the tapered lock means and then acts through the first lost motion connection to move the jaws outwardly to release the workpiece.

21 Claims, 11 Drawing Figures

ROTATABLE CHUCK MECHANISM

The foregoing abstract is merely a resume of one general application, is not a complete discussion of all principles of operation or applications, and is not to be construed as a limitation on the scope of the claimed subject matter.

BACKGROUND OF THE INVENTION

In manually operated chucks some form of worm or scroll mechanism is often provided so that the chuck jaws tightly clamp on the outside diameter of a workpiece. In high production chucks this time loss in having an operator manually actuate the worm or scroll cannot be tolerated. Accordingly, most high production chucks are actuated through an axially movable actuator such as a draw bar from a fluid pressure source, either air or hydraulic. Some form of linkage changes this axial motion into radial motion to move the jaws inwardly and outwardly for chucking and releasing a workpiece. As chucks become larger in diameter and rotating speeds increase, the safety of operators of the machine becomes of far greater importance. The prior art has known of use of a check valve in the fluid line so that if fluid pressure fails the actuator hopefully does not move enough so that the chuck jaws would release the workpiece. The prior art has also known wedge type chucks in which the mechanical advantage is high enough, namely; the taper of the wedge is about 6 degrees, so that it acts as a locking taper and upon loss of fluid pressure the locking taper of the wedge prevents the outside diameter jaws from moving outwardly sufficiently to release the workpiece. The difficulty with the check valve arrangement is that it does not provide safety in case the threads are stripped on the draw bar or other mechanical parts in the actuating mechanism should fail. The difficulty with the locking taper on the wedge type chuck is that it takes an extra long range of movement of the actuator in order to provide sufficient range of radial movement of the chuck jaws. This long range of movement makes the chuck cumbersome and often weaker because of longer overhang of stressed parts.

SUMMARY OF THE INVENTION

Accordingly, the problem to be solved is how to provide sufficient safety to a chuck designed for high speed rotation with jaws gripping the outside diameter of the workpiece, so that, upon loss of fluid pressure or the like so that there is no force on the actuator, the jaws will not release the workpiece despite action of centrifugal force on the jaws. The problem is solved by utilizing a lock means urged toward locking action acting on at least one of the jaws when the chuck actuator is moved toward the chuck closed condition.

The invention may be incorporated in a chuck comprising, in combination, a chuck body having an axis of rotation, a movable actuator in said body, a plurality of jaws movable in a generally radial direction on said chuck body, first linkage means interconnecting said actuator and said jaws to provide generally radial movement of said jaws in accordance with movement of said actuator, lock means acting on at least one of said jaws relative to one of said chuck body and said linkage means, and urging means including the action of centrifugal force connected to urge said lock means in a first direction toward locking of said at least one jaw with said actuator moved in a first direction for chucking a workpiece, whereby lack of force on said actuator will not permit centrifugal force to cause the jaws to move in a generally radially outward direction because of the locking action of said lock means.

An object of the invention is to provide a safe high speed high production chuck which does not release a workpiece even if the actuating force is released.

Another object of the invention is to provide a lost motion connection in the linkage between the actuator and the jaws with this lost motion connection permitting release of a lock means so that the workpiece may be released.

Other objects and a fuller understanding of the invention may be had by referring to the following description and claims, taken in conjunction with the accompanying drawing.

DESCRIPTION OF THE PREFERRED EMBODIMENTS

Figure 1:
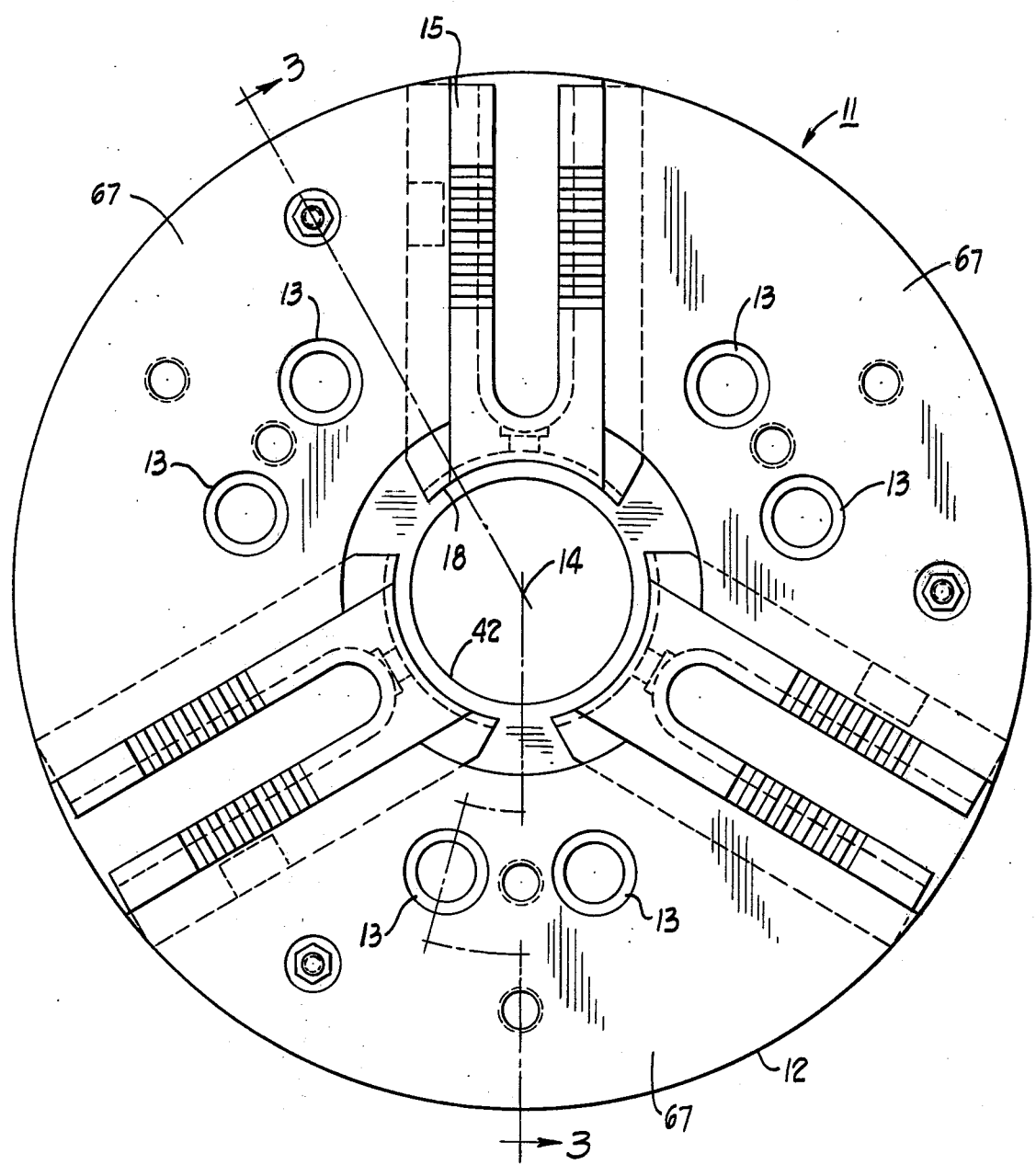
FIG. 1 is a front elevational view of a chuck embodying the invention, with the jaws removed.
Figure 2:
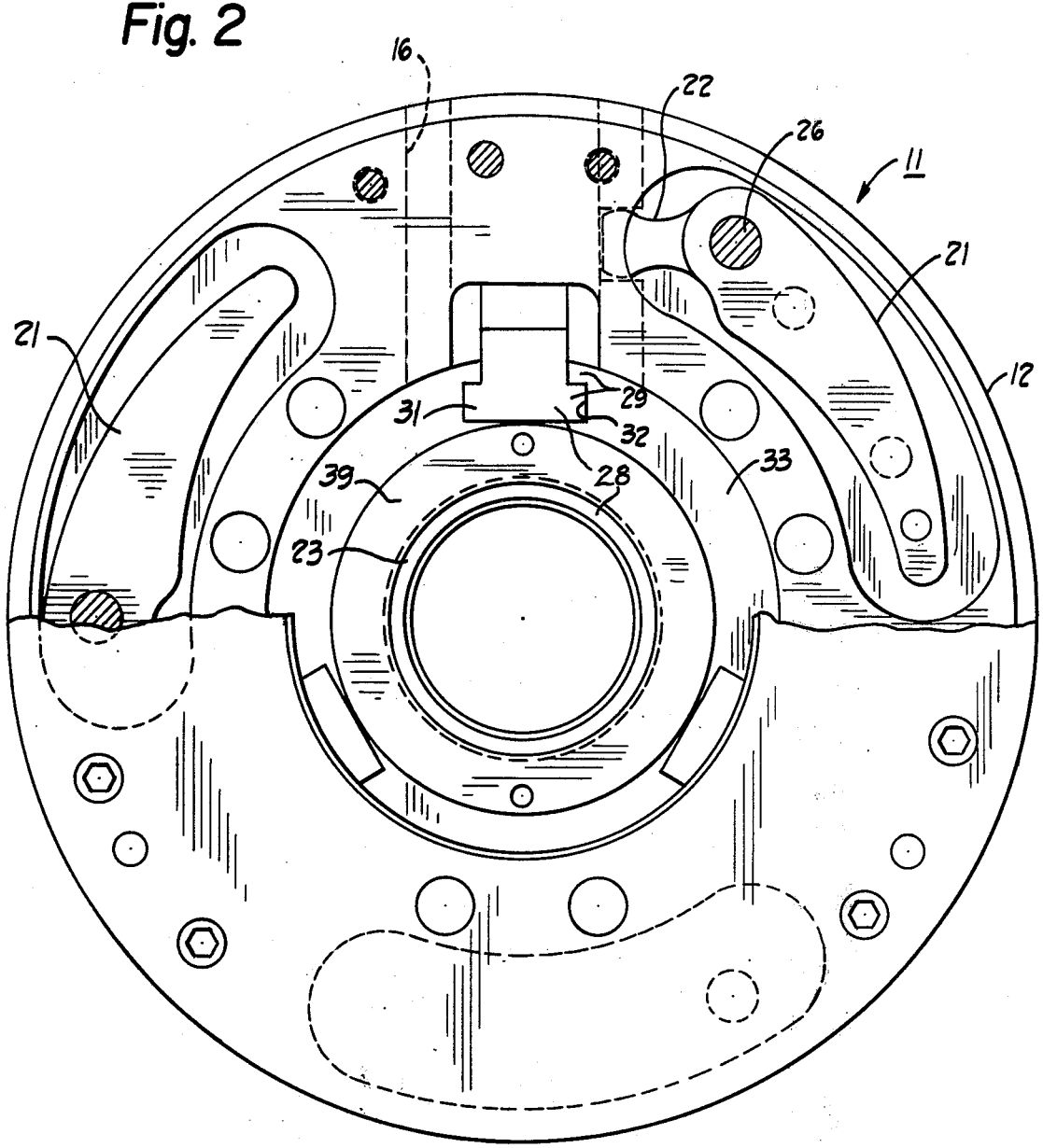
FIG. 2 is a rear elevational view, partly broken away, of the chuck of FIG. 1.
Figures 3, 4, 5, 6, 7, 8:
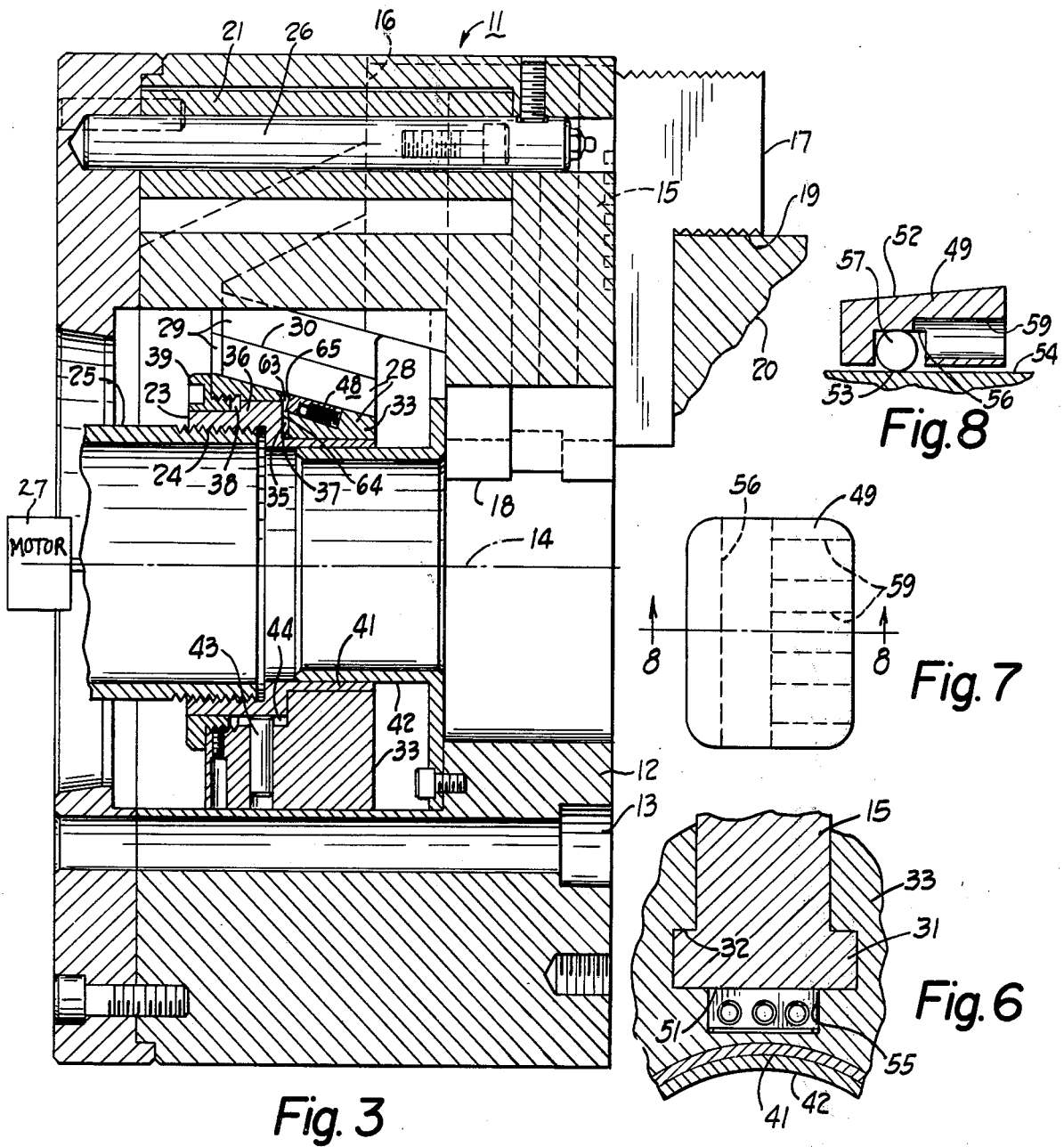
FIG. 3 is a sectional view on line 3—3 of FIG. 1.
FIG. 4 is an enlarged partial sectional view showing the chuck in the workpiece chucked position.
FIG. 5 is an enlarged view similar to FIG. 4 but showing the chuck in the workpiece released position.
FIG. 6 is a sectional view taken along the line 6—6 of FIG. 4.
FIG. 7 is an enlarged plan view of the tapered lock means.
FIG. 8 is a sectional view on line 8—8 of FIG. 7.

FIGS. 1, 2 and 3 generally show a chuck 11 having a chuck body 12 having mounting holes 13 for attachment to a rotatable spindle or the like, not shown, for rotation about an axis 14. The chuck has a plurality of master jaws, shown as three in this case, with these jaws 15 mounted in the body for generally radial movement. Such movement may be by way of guides shown in this case as radial slots 16 and the master jaws 15 have a dovetail or T-slot connection with these radial slots 16 so that the only movement of the jaws is radial. The master jaws 15 are shaped so as to receive any of various types of workpiece jaws, such as collet pads on the inner radial face 18, internal diameter chucking jaws, or as shown outside diameter chucking jaws 17 having serrations 19 for gripping a workpiece 20. FIG. 1 shows the master jaws 15 without any workpiece jaws 17 thereon.

A counterweight 21, one for each master jaw 15, acts on each master jaw by a pin-in-slot connection 22 and the counterweight is pivoted at 26 on the chuck body 12. These counterweights 21 substantially counterbalance the centrifugal force on the respective master jaw 15 and attached chucking jaw 17, so that the chucking force does not materially lessen during high speed rotation.

The chuck 11 is illustrated as being a high production chuck utilizing an actuator 23 to actuate the master jaws 15. In this preferred embodiment the actuator 23 is axially movable and is coaxially positioned in the chuck body 12. This axial movement is provided by a threaded connection 24 to a draw bar or to a draw tube 25, this draw tube 25 being hollow so as to permit introduction of workpiece bar stock through the hollow center of the chuck 11. For rapid production work, the draw tube 25 is moved axially by a fluid motor 27 such as a fluid piston and cylinder actuator, and this might be either air pressure or hydraulic pressure.

First linkage means 28 is provided between the actuator 23 and the master jaws 15 to provide the radial movement of the jaws in accordance with axial movement of the actuator 23. In this case the first linkage means 28 includes interlocking wedge means 29 which have wedge surfaces 30 at an acute angle to the rotational axis 14. This wedge surface angle might be in the order of 14 degrees which provides a four to one ratio between the axial movement of the actuator 23 and the radial movement of the master jaws 15. The wedge means 29 are interlocking by any suitable means, and as shown this may be a T-head 31 on the master jaws and a T-slot 32 on a wedge ring 33, so that movement of the ring 33 in a first axial direction to the left as viewed in FIG. 3 will move the master jaws 15 radially inwardly and also axial movement of the ring 33 in a second, opposite direction will move the jaws 15 radially outwardly. This wedge ring 33 is coaxially mounted in the chuck body 12, and has a first lost motion connection 35 with the actuator 23.

The actuator 23 has an annular enlarged flange 36 which is trapped between a radial shoulder 37 on the wedge ring 33 and another radial shoulder 38 on a nut 39 threaded into the wedge ring 33. The axial dimension of the flange 36 is less than the axial dimension between the shoulder 37 and 38 to provide this first lost motion connection 35 which may be of any suitable amount, for example, 1/16 to 1/8 of an inch.

The actuator 23 has an axially extending sleeve 41 slidably mounted on a sleeve 42 which is fixed in the chuck body 12 and this assures coaxial positioning of the actuator 23. The wedge ring 33 is slidably mounted on the outside surface of this sleeve 41 for coaxial positioning of this wedge ring 33 and a pin 43 in the wedge ring 33 slides in a longitudinal groove 44 so that the actuator 23 and wedge ring 33 are non-rotatively yet slidably interconnected.

Lock means 48 is provided for the chuck and acts on at least one of the master jaws 15. In the preferred embodiment this lock means is tapered and acts on each of the master jaws for maximum locking action. This acting on a master jaw may be indirectly, but as shown, is directly on the master jaw. The tapered lock means 48 is shown to enlarged scale in FIGS. 4–8. The tapered lock means has first, second, third and fourth surfaces 51–54, respectively. The tapered lock means in the preferred embodiment includes a wedge 49 and in the preferred embodiment there is a wedge for each master jaw 15. The first surface 51 is on the inner face of the T-head 31 of each master jaw. The second surface 52 is complementary thereto and is on the outer surface of the wedge 49 to engage the surface 51. The fourth surface 54 is on the bottom of a recess 55 in the wedge ring 33 which receives each respective wedge 49. A pocket 56 is provided in each wedge and a cylindrical roller 57 is provided in each pocket 56. The lower peripheral surface of each cylindrical roller 57 extends slightly out of the respective pocket 56, for example, 0.003 inches, and it is this protruding part of the roller 57 which is the third surface 53 of the tapered lock means 48. Urging means is provided to urge the lock means 48 toward a locked condition. In the preferred embodiment, this urging means includes spring means 58, shown as three individual compression springs, received in bores 59 in the large end of each wedge 49. These springs urge the wedge 49 and the roller 57 toward the small end of the wedge, which is generally in the first axial direction, as shown in FIGS. 3 and 4. The two surfaces 51 and 54 have an acute angle therebetween which is a locking taper, for example, five degrees. The urging means also includes the mounting of the wedge 49 on the first surface 51, which, because of the approximately 14° angle, causes centrifugal force to act outwardly on the wedge. This gives a component of force in the radially outward direction, as the chuck rotates, urging the wedge 49 toward a locked condition.

Second linkage means 62 is provided to actuate the tapered lock means 48 in accordance with movement of the actuator 23. This second linkage means 62 includes second lost motion means 63. This lost motion means includes a small space between the face 64 of the flange 36 and the end face 65 of the wedge 49.

OPERATION

FIGS. 3 and 4 show the chuck in a chucked condition wherein the jaws 17 grip the outside diameter of a workpiece 20. To achieve this condition, the motor 27 moves in a first axial direction, which is to the left as viewed in FIGS. 3 and 4, to move the draw tube 25 and the actuator 23 in this first axial direction. The first linkage means 28 actuates the master jaws 15 and because the chucking jaws are directly attached thereto these chucking jaws will move in a radial direction. The first linkage means 28 includes the interlocking wedge means 29 to effect this radial movement of the jaws with an axial movement of the actuator 23. As the actuator 23 moves in this first axial direction to the left, the first lost motion means 35 is taken up and then the flange 36 engages the nut 39 to move the wedge ring 33 to the left. Due to the wedge means 29, this pulls the master jaws 15 radially inwardly to chuck the workpiece 20. The counterweights 21 move outwardly slightly during this radially inward movement of the jaws 15.

During this movement to the left of the flange 36, the space between the flange face 64 and wedge ring shoulder 37 will increase and this permits the springs 58 to move the wedges 49 to the left, generally in this first axial direction. The roller 57 rolls on the fourth surface 54 and the surfaces 51 and 52 are relatively slidable. The springs 58 urge the wedges toward the small end of the wedge, as viewed in FIG. 4 so that the second lost motion means 63 between the wedge face 65 and the flange face 64 is less than the first lost motion means 35 between the flange face 64 and the wedge ring shoulder 37.

When it is desired to release the workpiece 20, the motor 27 moves the draw tube 25 in the opposite axial direction, namely, to the right as viewed in FIGS. 3 and 4. The initial portion of this movement actuates the second linkage means 62 because the second lost motion means 63 is smaller than the first lost motion means 35. As will be noted in a comparison between FIGS. 4 and 5, as the flange 36 moves to the right, it first engages the end face 65 of the wedge 49 and moves this wedge to the right despite the urging of the springs 58. This releases the tapered lock means provided by the wedges 49 because the wedges are moved toward the larger end of the recesses 55. Next the first linkage means 28 is actuated upon taking up of the first lost motion connection 35. This takes place when the flange face 64 engages the wedge ring shoulder 37 so that this wedge ring 33 is moved to the right with the actuator 23. Continued movement to the right of the wedge ring 33 moves the jaws 15 outwardly to release the workpiece 20.

Figure 9:
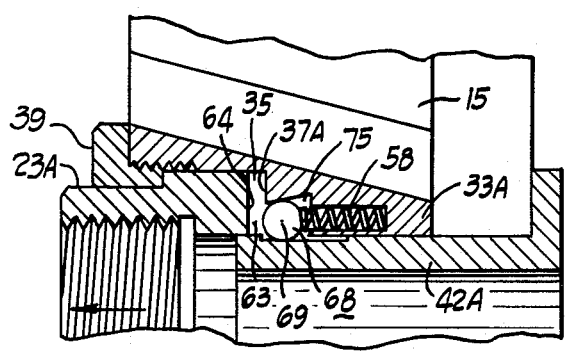
FIG. 9 is an enlarged partial sectional view showing a modified chuck in the chucked position.
Figure 10:
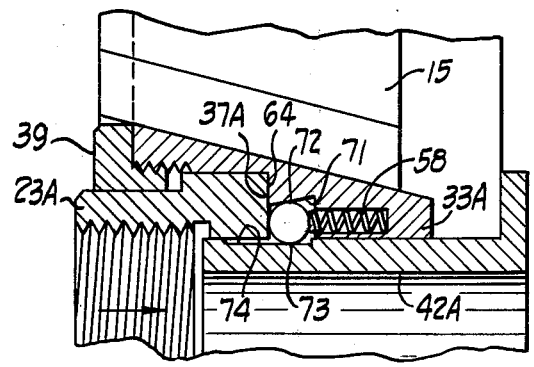
FIG. 10 is an enlarged view similar to FIG. 9 but showing the chuck in the workpiece released position.

FIGS. 9 and 10 illustrate a second embodiment of the invention showing a tapered lock means 68. In this embodiment the sleeve 42A is made with a thicker wall and the axially movable actuator 23A slides on the outside surface of this sleeve 42A to coaxially position this actuator. The tapered lock means 68 includes a rollable element 69 which may be a ball but preferably is a cylindrical rollable element for larger surface contact. There may be only one rollable element but preferably there are a plurality symmetrically placed around the sleeve 42A.

The tapered lock means 68 has first, second, third and fourth surfaces 71-74, respectively. The first surface 71 is on an inwardly facing surface of a recess 75 in the wedge ring 33A. The second surface 72 is on the rollable element 69 to cooperate with surface 71. The surface 73 is on the rollable element 69 to cooperate with the fourth surface 74 which is on the sleeve 42A and preferably is a small flat surface to cooperate with the cylindrical rollable element. If the rollable element 69 is a ball, then it is not necessary that this fourth surface 74 be a flat surface. One or more springs 58 urge the rollable element 69 toward the left as viewed in FIGS. 9 and 10. The first surface 71 tapers relative to the fourth surface 74 and in this preferred embodiment the tapering is on the surface 71. The two surfaces have an acute angle therebetween and in this preferred embodiment this is an angle of about five degrees so that a locking taper is achieved. Again the first lost motion means 35 is provided between the face 64 of the actuator 23A and the shoulder 37A on the wedge ring 33A. Also the second lost motion means 63 is provided in this case between the face 64 of the actuator 23A and the protruding portion of the rollable element 69, as viewed in FIG. 9.

In operation, the embodiment of FIGS. 9 and 10 acts in a manner similar to that of FIGS. 1-8. FIG. 9 shows the actuator 23A moved to the left whereat it takes up the first lost motion means, acts on the nut 39 and pulls the wedge ring 33A to the left. This moves the jaws radially inwardly to chuck the workpiece. When the actuator 23A is moved to the right, in the transition between the positions of FIGS. 9 and 10, first the second lost motion means 63 is taken up, next the face 64 of the actuator 23A engages the rollable element or elements 69 and moves them to the right releasing the tapered lock means 68. Finally the face 64 of the actuator 23A engages the shoulder 37A to move the wedge ring 33A to the right and move the jaws outwardly to release the workpiece. Again as in the embodiment of FIGS. 1-8, if the actuator 23A should fail to have a leftward force thereon, e.g. as by loss of fluid pressure, then any centrifugal force acting on the jaws to move them radially outwardly, and the concomitant force to the right imparted to the wedge ring 33A, would be resisted by the tapered lock means 68. This wedge ring 33A cannot move to the right appreciably because it will be locked by the tapered lock means 68 on the sleeve 42A. Accordingly a majority of the original chucking force on the workpiece will be maintained so that the workpiece does not fly out of a rapidly rotating chuck if force is lost on the actuator 23A. In this embodiment the tapered lock means 68 does not act directly on the jaws 15 instead it acts indirectly on these jaws by acting on the first linkage means 28.

The tapered lock means 48 or 68 provides a reliable and immediate acting safety feature if any one of several things might happen; failure of fluid pressure, bursting of a fluid pressure line, stripping of the threads 24, or breaking of the draw tube 25 and the like. In any event similar to this the force on the actuator 23 would be released during the time that the workpiece 20 was chucked, as in FIGS. 3, 4 and 9. This releasing of the force on the actuator 23 could be a dangerous condition if it were not for the tapered lock means 48 or 68. The large diameter of the chuck 11 and the high speeds at which it operates, means that centrifugal force will act on the master jaws 15 and chucking jaws 17, despite the counterweights 21. The counterweights may not be of the precise weight required to counterbalance the centrifugal force, because the chucking jaws 17 may be one of several different types. They may be relatively light weight collet pads on the inner face 18 or they may be large, heavy and complex jaws to grip a large diameter workpiece. Especially in the latter case, the centrifugal force of the combined jaws 15 and 17 may overcome the force of the counterweights 21. This centrifugal force acts through the 1:4 mechanical disadvantage of the interlocking wedge means 29 to try to move the wedge ring 33 to the right, namely, in the second axial direction. This is where the tapered lock means 48 or 68 immediately comes into play.

This same centrifugal force, however, acts thru the 1:4 mechanical disadvantage on the wedges 49 to provide additional urging means urging the wedges toward a locked condition.

Many ways may be utilized to obtain a greater frictional force between the first and second surfaces 51 and 52 than between the third and fourth surfaces 53 and 54. Surfaces 51 and 52 may be abrasive or surfaces 53 and 54 may be coated with or made of a slippery material, or both.

In the embodiment of FIGS. 1-8, the frictional force between the first and second surfaces 51 and 52 is considerably greater than the frictional force between the third and fourth surfaces 53 and 54. This is primarily because the third surface 53 is the external surface of the roller 57 so that the wedge 49 rolls on the fourth surface 54. This wedging action or tapered lock means 48 locks the master jaw 15 to the wedge ring 33 so that the wedge ring 33 has practically no movement to the right and hence the jaws 15-17 still retain a majority of their initial chucking force radially inwardly on the workpiece 20. This is a very great safety factor so that the workpiece 20 will not fly out of the chuck jaws at high rotational speeds should some accident occur which releases the axial force on the actuator 23. The fact that each tapered lock means acts directly on each master jaw 15 assures maximum holding power of the jaws should this accidental mishap occur, for example, loss of fluid pressure.

It will be noted that the first linkage means 28 is that which actuates the jaws radially in and out in accordance with axial movement of the actuator 23. This first linkage means includes the first lost motion connection 35 which is of a greater extent than the second lost motion means 63. This means that upon delibrate motion of the actuator 23 to the right to unchuck the workpiece 20, the tapered lock means 48 or 68 is first released and then the jaws are moved outwardly. Accordingly, the tapered lock means does not provide any hindrance to the normal actuation of the chuck in either the chucking or release movements. Also the first lost motion connection 35 is only a small amount, for example, 1/16 to 1/8 of an inch so that time taken to move the actuator 23 through this lost motion is negligible and the chuck is quickly actuated open or closed.

Figure 11:
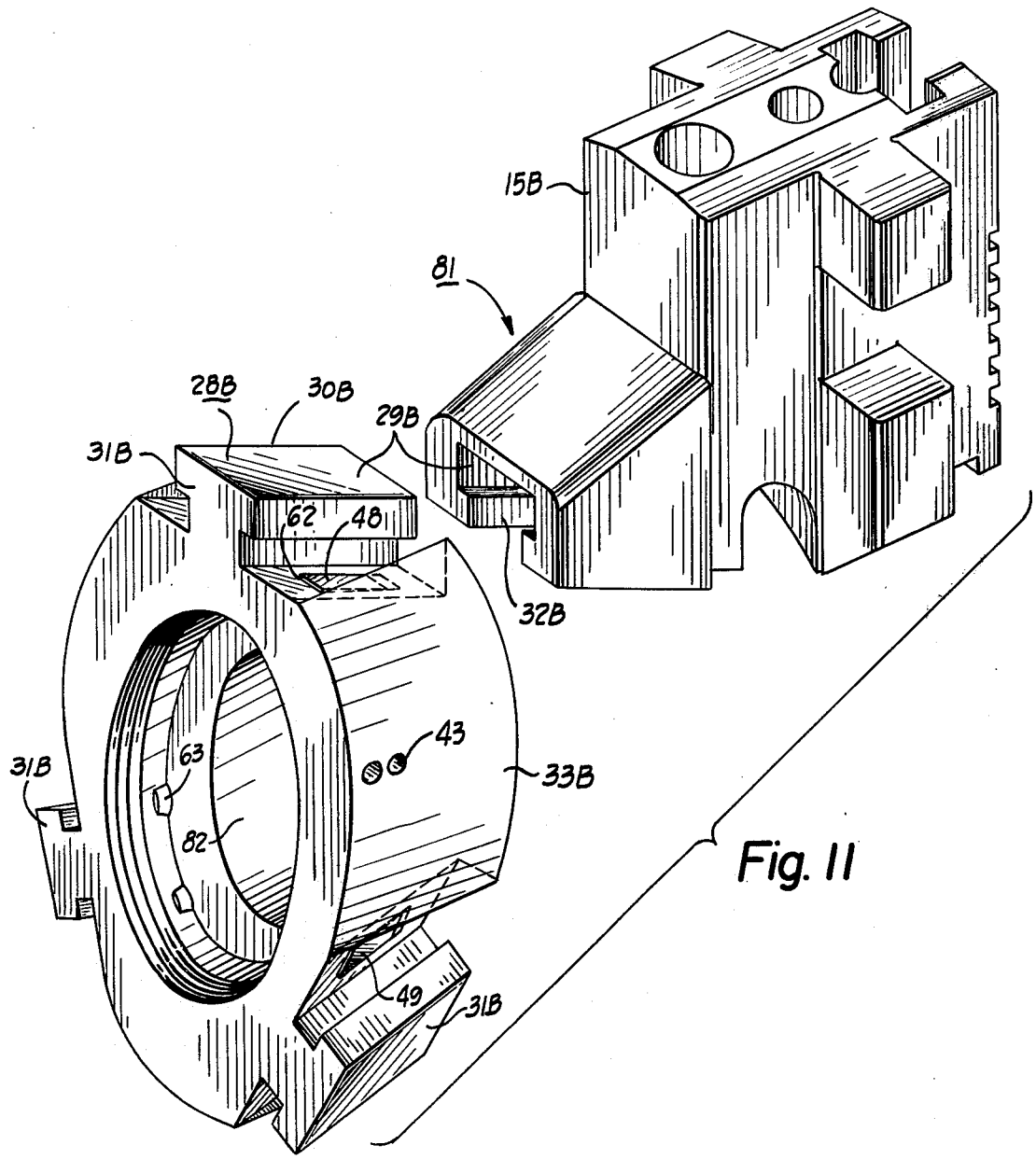
FIG. 11 is a perspective view of the wedge ring and a jaw of a modification.

FIG. 11 illustrates a further embodiment of a chuck 81 of which only the changed parts are shown. These parts include the first linkage means 28B and interlocking wedge means 29B. This interlocking wedge means includes a wedge ring 33B and a modified master jaw 15B. The wedge ring 33B is, as above, shown to accommodate three master jaws 15B, however, only one jaw is shown in the partial view of FIG. 11. The interlocking wedge means 29B is modified from that shown in FIGS. 1-5 by being a reversed construction. The T-head 31B is now on the wedge ring 33B and the T-slot 32B is now on the master jaw. This provides wedge surfaces 30B similar to those in the embodiment of FIGS. 1-5 to move the master jaws radially as the wedge ring 33B is moved axially. An advantage of placing the T-slots 32B in the master jaws is that a larger diameter central aperture 82 may be provided in the wedge ring to accommodate larger bar stock workpieces.

The second linkage means 62 may be the same as in FIGS. 1-5 and includes the second lost motion means 63 with the same tapered lock means 48. These tapered lock means still include the spring urged wedges 49 except thaat they are placed to one side of the T-heads 31B and may be one or more for each chuck. Two wedges are illustrated in FIG. 11 and could involve 1, 2 and for symmetry 3 or 6, wedges 49 per chuck.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be restored to without departing from the spirit and the scope of the invention as hereinafter claimed.

What is claimed is:

1. A chuck comprising, in combination,
a chuck body having an axis of rotation,
a movable actuator in said body,
a plurality of master jaws movable in a generally radial direction on said chuck body,
first linkage means including first lost motion means interconnecting said actuator and said master jaws to provide generally radial movement of said jaws in accordance with movement of said actuator,
tapered lock means acting on at least one of said master jaws relative to one of said chuck body and said linkage means,
spring means urging said lock means in a first direction toward locking of said one master jaw upon movement of said actuator in a first direction for chucking a workpiece, whereby lack of force on said actuator will not permit centrifugal force to cause the master jaws to move in a generally radially outward direction because of the tapered locking action of said lock means,
and second linkage means including second lost motion means being smaller than said first lost motion means and interconnecting said actuator and said tapered lock means whereby movement of said actuator in the opposite direction firstly moves said lock means to unlock the tapered locking action on said at least one master jaw and secondly moves all said master jaws outwardly to release any workpiece chucked therein.

2. A chuck as set forth in claim 1, wherein said tapered lock means includes wedge means.

3. A chuck as set forth in claim 2, wherein said wedge means acts on surfaces establishing a locking taper.

4. A chuck as set forth in claim 1, wherein said first linkage means includes interlocking wedge means between said actuator and said master jaws.

5. A chuck as set forth in claim 4, wherein said actuator moves in said first direction for chucking a workpiece and moves in the opposite direction for releasing a workpiece and during such movement initially said second linkage means utilizes said second lost motion means to engage said tapered lock means and move it in a second unlocking direction and secondly said first linkage means utilizes said first lost motion means and then moves the jaws for releasing a workpiece.

6. A chuck as set forth in claim 4, wherein said tapered lock means acts on the interlocking wedge portion of said at least one of said master jaws.

7. A chuck as set forth in claim 1, wherein said actuator moves axially and said spring means urges said lock means in a first direction having an axial component the same as said first axial direction of movement of said actuator for chucking a workpiece.

8. A chuck as set forth in claim 1, including first and second surfaces relatively movable with movement of said lock means and acting between said master jaw and said lock means,
and third and fourth surfaces relatively movable with movement of said lock means and acting between said lock means and said chuck body.

9. A chuck as set forth in claim 8, wherein said tapered lock means includes wedge means having said second and third surfaces thereon.

10. A chuck as set forth in claim 8, wherein said first and second surfaces have a frictional force therebetween materially greater than that between said third and fourth surfaces.

11. A chuck as set forth in claim 8, wherein said third and fourth surfaces include a rollable element rolling on a flat surface.

12. A chuck as set forth in claim 1, wherein said tapered lock means acts directly on said at least one master jaw.

13. A chuck as set forth in claim 1, wherein said actuator is mounted for axial movement.

14. A chuck as set forth in claim 3, wherein said first linkage means includes an axially movable wedge ring, and interlocking wedge means between said wedge ring and said master jaws.

15. A chuck as set forth in claim 4, wherein said first lost motion means acts between said actuator and said wedge ring.

16. A chuck as set forth in claim 1, wherein said tapered lock means acts on each of said master jaws.

17. A chuck as set forth in claim 1, wherein said tapered lock means includes a small rollable element acting on surfaces tapering at a small acute angle.

18. A chuck as set forth in claim 17, wherein said tapering surfaces establish a locking taper.

19. A chuck as set forth in claim 1, wherein said tapered lock means acts in said first linkage means and indirectly on said at least one master jaw.

20. A chuck as set forth in claim 4, wherein said interlocking wedge means includes a T-slot in said actuator interfitting with a T-head in said master jaws.

21. A chuck as set forth in claim 4, wherein said interlocking wedge means includes a T-head in said actuator interfitting with a T-slot in said master jaws.

* * * * *